US012435738B2

(12) United States Patent
Shimada

(10) Patent No.: US 12,435,738 B2
(45) Date of Patent: Oct. 7, 2025

(54) FLUID CIRCUIT

(71) Applicant: EAGLE INDUSTRY CO., LTD., Tokyo (JP)

(72) Inventor: Yoshiyuki Shimada, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/691,421

(22) PCT Filed: Sep. 14, 2022

(86) PCT No.: PCT/JP2022/034388
§ 371 (c)(1),
(2) Date: Mar. 12, 2024

(87) PCT Pub. No.: WO2023/048044
PCT Pub. Date: Mar. 30, 2023

(65) Prior Publication Data

US 2025/0137468 A1 May 1, 2025

(30) Foreign Application Priority Data

Sep. 21, 2021 (JP) ................................ 2021-152778

(51) Int. Cl.
*F15B 3/00* (2006.01)
*F04B 9/107* (2006.01)
(Continued)

(52) U.S. Cl.
CPC .............. *F15B 3/00* (2013.01); *F04B 9/1076* (2013.01); *F15B 1/024* (2013.01); *F15B 1/027* (2013.01);
(Continued)

(58) Field of Classification Search
CPC ........... F15B 3/00; F04B 9/107; F04B 9/1076
See application file for complete search history.

(56) References Cited

U.S. PATENT DOCUMENTS 2,938,347 A 5/1960 Sturgis
3,540,348 A 11/1970 Pennther ......................... 91/306
(Continued)

FOREIGN PATENT DOCUMENTS

EP 0439621 8/1990
EP 3604827 2/2020 ............. F15B 21/14
(Continued)

OTHER PUBLICATIONS

International Search Report and Written Opinion, and International Preliminary Report on Patentability issued in PCT/JP2022/012344, dated May 31, 2022, 20 pages.
(Continued)

*Primary Examiner* — Michael Leslie
(74) *Attorney, Agent, or Firm* — HAYES SOLOWAY P.C.

(57) ABSTRACT

There is provided a fluid circuit capable of continuously driving pressure-increasing devices with a simple configuration. A plurality of pressure-increasing devices are connected in parallel to a fluid supply device that delivers a working fluid. A stroke direction of the piston of each of the pressure-increasing device is switched by the working fluid. A phase of the piston of one pressure-increasing device is different from a phase of the piston of the other pressure-increasing device.

7 Claims, 12 Drawing Sheets

(51) Int. Cl.
*F15B 1/02* (2006.01)
*F15B 1/027* (2006.01)
*F15B 11/032* (2006.01)

(52) U.S. Cl.
CPC ....... *F15B 11/032* (2013.01); *F15B 2211/212* (2013.01); *F15B 2211/214* (2013.01); *F15B 2211/6306* (2013.01); *F15B 2211/6316* (2013.01); *F15B 2211/6346* (2013.01); *F15B 2211/6355* (2013.01)

(56) References Cited

U.S. PATENT DOCUMENTS

| | | | | |
|---|---|---|---|---|
| 3,811,795 | A | 5/1974 | Olsen | F03C 1/10 |
| 5,007,544 | A | 4/1991 | Saotome | |
| 5,706,657 | A | 1/1998 | Ambroski | |
| 6,526,747 | B2 | 3/2003 | Nakatani | |
| 9,051,944 | B2 | 6/2015 | Wen | F15B 21/14 |
| 9,279,236 | B2 | 3/2016 | Zhang | E02F 9/2217 |
| 9,926,947 | B2 * | 3/2018 | Villar | F04B 9/133 |
| 10,247,206 | B2 * | 4/2019 | Shimada | F15B 13/0401 |
| 10,288,094 | B2 | 5/2019 | Spielvogel | |
| 2009/0317267 | A1 | 12/2009 | Gill et al. | |
| 2020/0032485 | A1 | 1/2020 | Hijikata et al. | |
| 2024/0159252 | A1 * | 5/2024 | Shimada | F15B 1/26 |
| 2024/0159255 | A1 * | 5/2024 | Shimada | F15B 9/08 |

FOREIGN PATENT DOCUMENTS

| | | | |
|---|---|---|---|
| GB | 2275969 | 9/1994 | F15B 3/00 |
| JP | 58102804 | 6/1983 | F15B 11/02 |
| JP | 58191388 | 12/1983 | F04B 31/00 |
| JP | 374605 | 3/1991 | F15B 11/00 |
| JP | H04120324 | 4/1992 | E02F 9/22 |
| JP | H04366001 | 12/1992 | F15B 3/00 |
| JP | H0777205 | 3/1995 | E02F 3/36 |
| JP | 10175459 | 6/1998 | B60K 25/00 |
| JP | 2000329103 | 11/2000 | F15B 7/02 |
| JP | 2003013904 | 1/2003 | F04B 9/105 |
| JP | 2008185182 | 8/2008 | F15B 21/14 |
| JP | 2008190694 | 8/2008 | F15B 11/00 |
| JP | 2011185417 | 9/2011 | F16H 61/00 |
| JP | 2014013062 | 1/2014 | F15B 11/028 |
| JP | 20168695 | 1/2016 | F15B 11/02 |
| JP | 2017150632 | 8/2017 | F15B 1/02 |
| JP | 2018204772 | 12/2018 | F15B 11/02 |
| JP | 2019049321 | 3/2019 | F15B 21/14 |
| KR | 20140094325 | 7/2014 | F15B 11/00 |
| WO | WO2016169943 | 10/2016 | E02F 9/2217 |

OTHER PUBLICATIONS

International Search Report and Written Opinion, and International Preliminary Report on Patentability issued in PCT/JP2022/012345, dated May 17, 2022, 24 pages.
International Search Report and Written Opinion, and International Preliminary Report on Patentability issued in PCT/JP2022/012346, dated May 31, 2022, 24 pages.
International Search Report and Written Opinion, and International Preliminary Report on Patentability issued in PCT/JP2022/034388, dated Nov. 22, 2022, 24 pages.
Official Action issued in related U.S. Appl. No. 18/284,248, dated Jul. 3, 2024, 13 pages.
Official Action issued in related U.S. Appl. No. 18/284,520, dated Jul. 18, 2024, 10 pages.
Official Action issued in related U.S. Appl. No. 18/284,248, dated Sep. 28, 2024, 9 pages.
Official Action issued in related U.S. Appl. No. 18/284,249, dated Sep. 28, 2024, 10 pages.
Parker Hannifin catalog "Hydraulic Cartridge Systems", HY15-3502/US, excerpt of pages CV1-CV2 (Year 2010).

* cited by examiner

FLUID CIRCUIT

TECHNICAL FIELD

The present invention relates to a fluid circuit, for example, a fluid circuit including pressure-increasing devices that increase a pressure of a working fluid.

BACKGROUND ART

In various fields, there is known a fluid circuit that drives an actuator using a working fluid such as working oil delivered from a fluid supply device such as a pump. In such a fluid circuit, the actuator is actuated or the working fluid can be accumulated in an accumulator by a pressure-increasing device capable of delivering the working fluid that is increased in pressure.

For example, a fluid circuit illustrated in Patent Citation 1 includes a pump that delivers a working fluid; a tank that stores the working fluid; a pressure-increasing device capable of increasing the pressure of the working fluid; and an accumulator capable of accumulating the working fluid that is increased in pressure. The pressure-increasing device includes a cylinder having a T shape and a hollow structure when viewed from the front; a piston having a T shape when viewed from the front; and biasing means for biasing the piston to one side in an axial direction, and the piston is provided inside the cylinder so as to be reciprocatable in the axial direction.

A space inside the cylinder is partitioned into a back pressure chamber and a pressure-increasing chamber by the piston. A flow passage communicating with the pump and a flow passage communicating with the tank are connected to the back pressure chamber, and the back pressure chamber is switched between communicating with the pump and communicating with the tank by a switching valve. A flow passage communicating with a tank side and a flow passage communicating with an accumulator side are connected to the pressure-increasing chamber. The piston is configured such that an area of an end surface facing the back pressure chamber is larger than an area of an end surface facing the pressure-increasing chamber.

In the fluid circuit configured in such a manner, when the working fluid is delivered from the pump to the back pressure chamber in a state where the working fluid is stored in the pressure-increasing chamber, the piston moves to the other side in the axial direction. Accordingly, the piston pressurizes the working fluid in the pressure-increasing chamber. Then, the working fluid that is increased in pressure to a predetermined pressure or more is accumulated in the accumulator. In addition, when the valve position of the switching valve is switched so that the back pressure chamber and the tank communicate with each other and the hydraulic oil in the back pressure chamber starts to be discharged to the tank, the pressure in the back pressure chamber gradually decreases. Then, when a biasing force of the biasing means becomes larger than a force that moves the piston to the other side in the axial direction, the piston is moved to the one side in the axial direction.

The pressure-increasing device described above is referred to as a so-called single-acting type. In contrast, there is also known a so-called double-acting type pressure-increasing device that reciprocates a piston by switching between chambers inside a cylinder into which a working fluid flows, according to the valve position of a switching valve.

CITATION LIST

Patent Literature

Patent Citation 1: JP 2011-185417 A (Page 7, FIG. 1)

SUMMARY OF INVENTION

Technical Problem

In the pressure-increasing device as disclosed in Patent Citation 1, by switching the valve position of the switching valve according to the reciprocation of the piston, the working fluid that is increased in pressure can be continuously delivered to the accumulator. However, since an electromagnetic switching valve that can be switched by an electric signal is typically used as such a switching valve, a device for outputting an electric signal, a device for sensing a valve position, and the like are required, so that the entirety of the device is increased in size, which is a problem. In addition, a control program is also complicated, and there is also a program in terms of cost.

The present invention is conceived in view of such problems, and an object of the present invention is to provide a fluid circuit capable of continuously driving pressure-increasing devices with a simple configuration.

Solution to Problem

In order to solve the foregoing problems, according to the present invention, there is provided a fluid circuit including: a fluid supply device that delivers a working fluid; and pressure-increasing devices that increase a pressure of the working fluid, wherein each of the pressure-increasing devices includes a cylinder connected to the fluid supply device, and a piston provided inside the cylinder so as to be reciprocatable in an axial direction, and delivers, from the cylinder, the working fluid having the pressure which is increased due to a movement of the piston toward a pressure-increasing chamber inside the cylinder by the working fluid delivered from the fluid supply device, the pressure-increasing devices are connected in parallel to the fluid supply device, a stroke direction of the piston of each of the pressure-increasing device is switched by the working fluid, and a phase of the piston of at least one of the pressure-increasing devices is different from a phase of the piston of remaining at least one of the pressure-increasing devices. According to the aforesaid feature of the present invention, the fluid circuit can repeatedly reciprocate the piston in each of the pressure-increasing devices using the working fluid. In addition, since the pressure-increasing devices are such that the stroke timings of the pistons are offset from each other, the peak pressure of the working fluid delivered from the pressure-increasing devices is small. For this reason, the fluid circuit can reduce vibration or noise generated when the pressure of the working fluid is increased.

It may be preferable that each of pilot switching valves using the working fluid delivered from the fluid supply device, as a pilot fluid, is provided for each of the pressure-increasing devices, and each of the pressure-increasing devices switches the stroke directions of the pistons according to a valve position of each of the pilot switching valves. According to this preferable configuration, the phases of the pistons of the pressure-increasing devices can be differentiated with a simple configuration.

It may be preferable that throttles are disposed between the fluid supply device and the respective pilot switching valves, and opening degrees of at least one of the throttles and remaining at least one of the throttles are different from each other. According to this preferable configuration, with a simple configuration, the phase of the piston of the at least one pressure-increasing device can be offset from that of the piston of the other pressure-increasing device.

It may be preferable that the throttles are variable throttles. According to this preferable configuration, the timings of switching the valve positions of the switching valves are easily adjusted.

It may be preferable that a pilot control valve that switches a flow of the pilot fluid of the pilot switching valves is provided, and the pilot control valve is switched by a movement of the piston of the one of the pressure-increasing devices. According to this preferable configuration, the phase of the piston of the other pressure-increasing device is accurately offset from that of the piston of the one pressure-increasing device.

It may be preferable that the pressure-increasing chambers of the pressure-increasing devices are connected in parallel. According to this preferable configuration, when the piston of one of the pressure-increasing devices has moved and stopped at an end position, the peak pressure generated in the pressure-increasing chamber of the pressure-increasing device can flow into the pressure-increasing chamber of the other pressure-increasing device. Since the other pressure-increasing chamber functions as a so-called buffer to buffer the pressure, the fluid circuit can reduce vibration or noise generated when the pressure of the working fluid is increased.

DESCRIPTION OF EMBODIMENTS

Modes for implementing a fluid circuit according to the present invention will be described below based on embodiments.

First Embodiment

A fluid circuit according to a first embodiment of the present invention will be described with reference to FIGS. 1 to 11.

Figure 1:
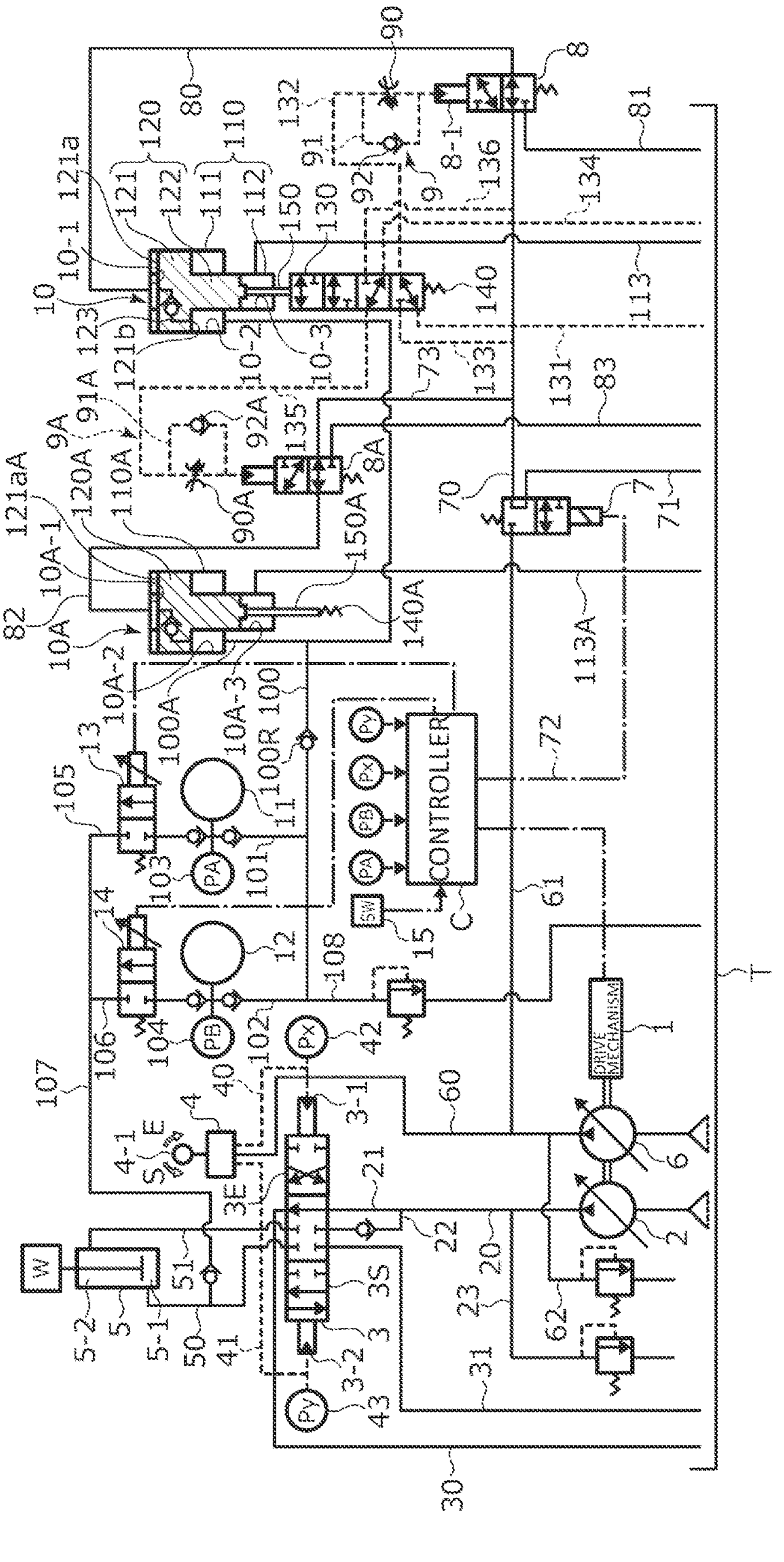
FIG. 1 is a schematic diagram illustrating a fluid circuit including pressure-increasing devices, according to a first embodiment of the present invention.

As illustrated in FIG. 1, the fluid circuit can be applied to, for example, hydraulic devices such as an actuator, a brake, a steering wheel, and a transmission in automobiles such as a normal passenger car and a truck or in work vehicles such as a hydraulic excavator, a forklift, a crane, and a garbage truck. Incidentally, the hydraulic circuit illustrated in FIG. 1 is one example of the fluid circuit of the present invention, and is not limited to a configuration of FIG. 1.

The fluid circuit according to the present embodiment is generally configured to move a workpiece W by actuating a cylinder 5 as an actuator using hydraulic pressure.

The fluid circuit mainly includes a main circuit hydraulic pump 2, a switching valve 3, a hydraulic remote control valve 4, the cylinder 5, a pilot circuit hydraulic pump 6 as a fluid supply device, an electromagnetic switching valve 7, switching valves 8 and 8A, adjustable flow return valves 9 and 9A, pressure-increasing devices 10 and 10A, accumulators 11 and 12, electromagnetic proportional switching valves 13 and 14, a controller C, and each oil passage as a flow passage.

First, a configuration of a main circuit side on which the cylinder 5 is actuated by the main circuit hydraulic pump 2 (hereinafter, simply referred to as the main pump 2) will be described. The main pump 2 and the pilot circuit hydraulic pump 6 driven by power from a drive mechanism 1 such as an engine of a vehicle deliver hydraulic oil to oil passages 20 and 60.

The hydraulic oil delivered from the main pump 2 flows into the switching valve 3 through oil passages 20 and 21.

The switching valve 3 is a six-port and three-position type open center switching valve. The switching valve 3 at a neutral position connects the oil passage 21 to a tank-side oil passage 30. The tank-side oil passage 30 is connected to a tank T. For this reason, the entire amount of the hydraulic oil delivered from the main pump 2 is discharged to the tank T.

In addition, the switching valve 3 at an extension position 3E connects the oil passage 20 and an oil passage 22 including a check valve to a head-side oil passage 50, and connects a rod-side oil passage 51 to a tank-side oil passage 31. The head-side oil passage 50 is connected to a head chamber 5-1 of the cylinder 5. The rod-side oil passage 51 is connected to a rod chamber 5-2 of the cylinder 5. The tank-side oil passage 31 is connected to the tank T.

In addition, the switching valve 3 at a contraction position 3S connects the oil passages 20 and 22 to the rod-side oil passage 51, and connects the head-side oil passage 50 to the tank-side oil passage 31.

On the other hand, the hydraulic oil delivered from the pilot circuit hydraulic pump 6 (hereinafter, simply referred to as the pilot pump 6) is delivered to the hydraulic remote control valve 4 through the oil passage 60. Incidentally, the hydraulic oil delivered to the hydraulic remote control valve 4 is not limited to the hydraulic oil delivered from the pilot pump, and may be a working fluid delivered from the main pump 2 and the cylinder 5, or may be changed as appropriate.

The hydraulic remote control valve 4 that is a variable pressure reduction valve reduces the hydraulic oil of a pilot primary pressure delivered from the pilot pump 6, to a pilot secondary pressure corresponding to an operation amount of an operation lever 4-1. The hydraulic oil of the pilot secondary pressure is delivered to signal ports 3-1 and 3-2 of the switching valve 3 through pilot signal oil passages 40 and 41.

Incidentally, of the hydraulic oil discharged from the pilot pump 6, extra oil other than the working oil delivered to a first pressure-increasing device 10 side to be described later through an oil passage 61 instead of being delivered from the hydraulic remote control valve 4 to the signal ports 3-1 and 3-2 is discharged to the tank T through a relief oil passage 62 including a relief valve.

Operation of the cylinder 5 according to operation of the hydraulic remote control valve 4 will be described.

The switching valve 3 is switched to the extension position 3E by operating the operation lever 4-1 in an extension direction E. The hydraulic oil delivered from the main pump 2 flows into the head chamber 5-1 of the cylinder 5 through the oil passages 20, 22, and 50. At the same time, the hydraulic oil in the rod chamber 5-2 is discharged to the tank T through the oil passages 51 and 31. At this time, an electric signal transmitted from a pressure sensor 42 installed on the pilot signal oil passage 40 is input to the controller C.

The switching valve 3 is switched to the contraction position 3S by operating the operation lever 4-1 in a contraction direction S. The hydraulic oil delivered from the main pump 2 flows into the rod chamber 5-2 of the cylinder 5 through the oil passages 20, 22, and 51. At the same time, the hydraulic oil in the head chamber 5-1 is discharged to the tank T through the oil passages 50 and 31. At this time, an electric signal transmitted from a pressure sensor 43 installed on the pilot signal oil passage 41 is input to the controller C.

In addition, a relief oil passage 23 including a relief valve is branched and connected to the oil passage 20. When the pressure in the oil passage 20 becomes abnormally high, the relief valve is opened, and the hydraulic oil is discharged from the relief oil passage 23 to the tank T.

Next, a configuration of a pilot circuit side that includes the first pressure-increasing device 10 and that is connected to the pilot pump 6 will be described. Incidentally, the oil passage 60, the hydraulic remote control valve 4, the pilot signal oil passages 40 and 41, and the relief oil passage 62 described above are included in the configuration of the pilot circuit side.

The electromagnetic switching valve 7 is provided in the oil passage 61 that is branched and connected to the oil passage 60. When a switch 15 is in an OFF state, the electromagnetic switching valve 7 disconnects the oil passage 61 and an oil passage 70.

In addition, the electromagnetic switching valve 7 to which an electric signal is input from the controller C through an electric signal line 72 by setting the switch 15 to an ON state connects the oil passage 61 and the oil passage 70.

The first switching valve 8 as one switching valve is provided in the oil passage 70. The first switching valve 8 is a pilot switching valve that switches between oil passages to be connected, according to pressure acting on a port 8-1. When the pressure acting on the port 8-1 is less than a predetermined value, the first switching valve 8 connects oil passages 70 and 80. When the pressure acting on the port 8-1 is the predetermined value or more, the first switching valve 8 connects oil passages 80 and 81. The oil passage 80 is connected to a back pressure chamber 10-1 of the first pressure-increasing device 10 to be described later. The tank-side oil passage 81 is connected to the tank T.

In addition, a branch oil passage 73 is branched and connected to the oil passage 70. The second switching valve 8A as the other switching valve is provided in the branch oil passage 73. The second switching valve 8A has substantially the same configuration as that of the first switching valve 8. When the pressure acting on a port 8A-1 is less than a predetermined value, the second switching valve 8A connects oil passages 73 and 82. When the pressure acting on the port 8A-1 is the predetermined value or more, the second switching valve 8A connects oil passages 82 and 83. The oil passage 82 is connected to a back pressure chamber 10A-1 of the second pressure-increasing device 10A to be described later. The tank-side oil passage 83 is connected to the tank T.

The first pressure-increasing device 10 is provided in the oil passage 80. The first pressure-increasing device 10 further increases the pressure of the hydraulic oil delivered from the pilot pump 6, and delivers the hydraulic oil to an oil passage 100. A check valve 100R is provided in the oil passage 100.

The second pressure-increasing device 10A is provided in the oil passage 82. The second pressure-increasing device 10A further increases the pressure of the hydraulic oil delivered from the pilot pump 6, and delivers the hydraulic oil to an oil passage 100A. The oil passage 100A is branched and connected to the oil passage 100. Namely, a pressure-increasing chamber 10-2 of the first pressure-increasing device 10 and a pressure-increasing chamber 10A-2 of the second pressure-increasing device 10A are connected in parallel by the oil passages 100 and 100A. Incidentally, a configuration of the pressure-increasing devices 10 and 10A will be described later.

An oil passage 101 including two check valves and an oil passage 102 including two other check valves are branched and connected to the oil passage 100.

In the oil passage 101, the accumulator 11 and a pressure sensor 103 that detects a pressure of the accumulator 11 are connected to each other between the two check valves. In addition, the electromagnetic proportional switching valve 13 is connected to a downstream side of the two check valves in the oil passage 101.

In the oil passage 102, the accumulator 12 and a pressure sensor 104 that detects a pressure of the accumulator 12 are connected to each other between the two check valves. In addition, the electromagnetic proportional switching valve 14 is connected to a downstream side of the two check valves in the oil passage 102.

The electromagnetic proportional switching valves 13 and 14 are of a normally closed type, and are connected to the controller C by electric signal lines.

The controller C controls the electromagnetic proportional switching valves 13 and 14 to a closed state or an open state based on electric signals input from the pressure sensors 42, 43, 103, and 104. Hereinafter, the electromagnetic proportional switching valve 13 will be described as an example.

When the pressure in the accumulator 11 decreases, an electric signal is input from the controller C, and the electromagnetic proportional switching valve 13 is closed. Accordingly, the accumulator 11 can accumulate the hydraulic oil that is increased in pressured and delivered from the first pressure-increasing device 10.

In addition, when the pressure in the accumulator 11 increases, the controller C inputs an electric signal to the electromagnetic proportional switching valve 13. The electromagnetic proportional switching valve 13 connects oil passages 101 and 105 at an opening degree corresponding to the input signal. Accordingly, the accumulated hydraulic oil delivered from the accumulator 11 is recovered into the head chamber 5-1 of the cylinder 5 through the oil passages 107 and 50.

In addition, by alternately switching the electromagnetic proportional switching valves 13 and 14 through the controller C, the fluid circuit can recover the hydraulic oil in a pressure increased state accumulated in the other of the accumulators 11 and 12 into a main circuit while accumulating the hydraulic oil in one thereof.

In addition, a relief oil passage 108 including a relief valve is branched and connected to the oil passage 100. When the accumulated hydraulic oil in the accumulators 11 and 12 has reached an allowable amount, the extra oil is discharged to the tank T through the relief oil passage 108.

Next, the pressure-increasing devices 10 and 10A will be described. Incidentally, since the second pressure-increasing device 10A has substantially the same configuration as that of the first pressure-increasing device 10, duplicate descriptions will be omitted or simplified. In addition, in the present embodiment, a spring 140 side of the first pressure-increasing device 10 and an opposite side will be described as an end position side (namely, a lower side in the drawings) and a start position side (namely, an upper side in the drawings), respectively. A start position and an end position are the positions of a piston 120 to be described later.

As illustrated in FIG. 1, the first pressure-increasing device 10 mainly includes a casing 110 as a cylinder, the piston 120, a control valve 130, a spring 140 as biasing means, and a rod 150. The piston 120 is provided to be movable inside the casing 110 in an axial direction. The spring 140 biases the piston 120 toward the start position side.

The casing 110 is formed in a substantially T-shaped stepped cylindrical shape when viewed from the front, and includes a large-diameter cylindrical portion 111 and a small-diameter cylindrical portion 112.

The oil passage 80 is connected to the start position side of the large-diameter cylindrical portion 111, and the oil passage 100 is connected to the end position side of the large-diameter cylindrical portion 111 on a radially outer side of the small-diameter cylindrical portion 112.

An oil passage 113 connected to the tank T is connected to a peripheral wall of the small-diameter cylindrical portion 112.

The piston 120 is formed in a T-shaped stepped columnar shape when viewed from the front, and includes a large-diameter portion 121 and a small-diameter portion 122.

The large-diameter portion 121 is formed such that an outer peripheral surface of the large-diameter portion 121 is slidable along an inner peripheral surface of the large-diameter cylindrical portion 111 of the casing 110. The small-diameter portion 122 is formed such that an outer peripheral surface of the small-diameter portion 122 is slidable along an inner peripheral surface of the small-diameter cylindrical portion 112 of the casing 110.

In the casing 110 in which the piston 120 is accommodated, a space inside the large-diameter cylindrical portion 111 is partitioned into the back pressure chamber 10-1 and the pressure-increasing chamber 10-2 by the large-diameter portion 121 of the piston 120.

A back pressure surface 121*a* of the large-diameter portion 121 of the piston 120 faces the back pressure chamber 10-1. An annular pressure-increasing surface 121*b* of the large-diameter portion 121 of the piston 120 faces the pressure-increasing chamber 10-2.

The oil passage 80 is connected to the back pressure chamber 10-1, and the oil passage 100 is connected to the pressure-increasing chamber 10-2. In addition, a spacer that restricts movement of the piston 120 is disposed and fixed on the start position side in the back pressure chamber 10-1.

In addition, the back pressure chamber 10-1 and the pressure-increasing chamber 10-2 can communicate with each other through an oil passage 123 provided to penetrate through the large-diameter portion 121 of the piston 120. The oil passage 123 includes a check valve.

In addition, a drain chamber 10-3 is partitioned off by the small-diameter cylindrical portion 112 of the casing 110 and the small-diameter portion 122 of the piston 120. The oil passage 113 communicates with the drain chamber 10-3.

The piston 120 is configured to be reciprocatable between the start position and the end position. The start position is a position where the back pressure surface 121*a* of the large-diameter portion 121 comes into contact with the spacer in the back pressure chamber 10-1 so that movement of the large-diameter portion 121 in the same direction is restricted. The end position is a position where an end surface on the end position side of the small-diameter portion 122 comes into contact with an inner surface on the end position side of the drain chamber 10-3 so that movement of the small-diameter portion 122 in the same direction is restricted.

The control valve 130 is a pilot control valve in this specification that controls pilot pressure to the respective ports 8-1 and 8A-1 of the switching valves 8 and 8A.

The rod 150 is disposed between the piston 120 and the control valve 130. The rod 150 penetrates through a bottom of the small-diameter cylindrical portion 112 of the casing 110. A state where each of the piston 120 and the control valve 130 is in contact with the rod 150 is held by a force from pressure acting on the back pressure surface 121*a* of the large-diameter portion 121 of the piston 120 and by a biasing force of the spring 140.

Incidentally, the piston 120 and the control valve 130 may be integrated, for example, by welding the rod 150 to one or both of the piston 120 and the control valve 130.

Figure 2:
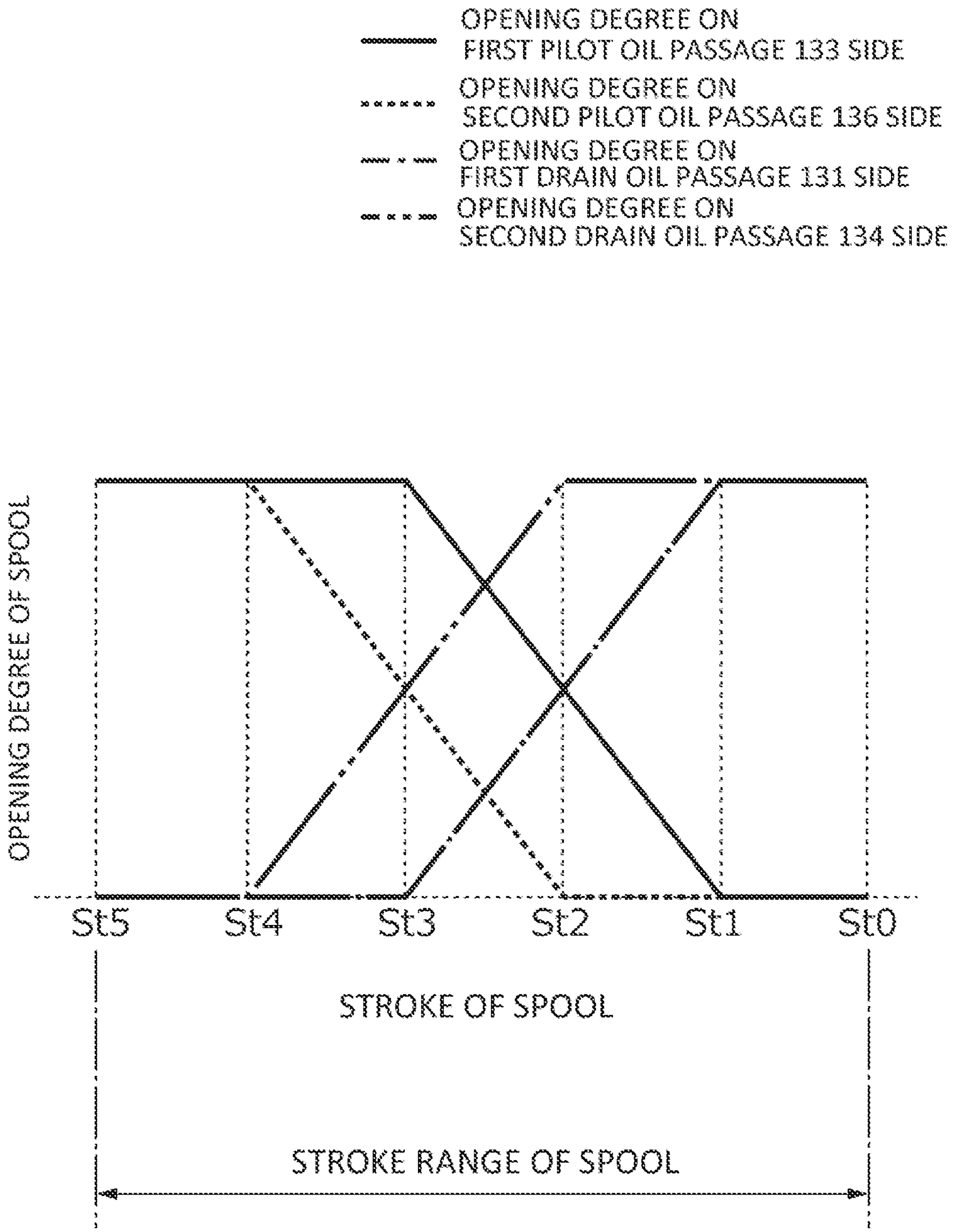
FIG. 2 is a graph for describing a characteristic of a spool valve in the first embodiment.

As illustrated in FIGS. 1 and 2, drain oil passages 131 and 134, pilot oil passages 132 and 135, and pilot oil passages 133 and 136 are connected to the control valve 130.

The first drain oil passage 131 and the second drain oil passage 134 are connected to the tank T. The first pilot oil passage 132 is connected to the port 8-1 of the first switching valve 8. The second pilot oil passage 135 is connected to the port 8A-1 of the second switching valve 8A. The first pilot oil passage 133 and the second pilot oil passage 136 are branched and connected to the oil passage 70.

The control valve 130 is configured to increase or reduce the opening degree on drain oil passages 131 and 134 sides and the opening degree on pilot oil passages 133 and 136 sides according to the stroke of the piston 120. In addition, the control valve 130 is always opened at a substantially constant opening degree with respect to the pilot oil passages 132 and 135. A detailed operation of the control valve 130 will be described later.

As illustrated in FIG. 1, in the first pilot oil passage 132, a first variable throttle 90 and the first adjustable flow return valve 9 including a first check valve 92 connected in parallel to the first variable throttle 90 are disposed.

In addition, in the second pilot oil passage 135, similarly, a second variable throttle 90A and the second adjustable flow return valve 9A including a second check valve 92A connected in parallel to the second variable throttle 90A are disposed.

In addition, the first variable throttle 90 is narrower in opening degree than the second variable throttle 90A.

The second pressure-increasing device 10A mainly includes a casing 110A, a piston 120A, a spring 140A, and a rod 150A, and has the same configuration as that of the first pressure-increasing device 10 except that the control valve 130 is not provided.

In the second pressure-increasing device 10A, the piston 120A partitions a space inside the large-diameter cylindrical portion 111 of the casing 110A into the back pressure chamber 10A-1 and the pressure-increasing chamber 10A-2.

The oil passage 82 is connected to the back pressure chamber 10A-1. The oil passage 101 is connected to the pressure-increasing chamber 10A-2. A drain oil passage 113A is connected to a drain chamber 10A-3.

A state where the rod 150A penetrating through a bottom of a small-diameter cylindrical portion 112 of the casing 110A is in contact with the piston 120A is held by a force from pressure acting on the back pressure surface 121*a* of the piston 120A and by a biasing force of the spring 140A.

Next, a pressure-increasing cycle performed by the pressure-increasing devices 10 and 10A will be described with reference to FIGS. 1 to 11. Incidentally, as described above, since the pressure-increasing devices 10 and 10A have substantially the same configuration, and the operations thereof are the same, duplicate descriptions will be omitted or simplified. In addition, the pressure-increasing devices 10 and 10A and each oil passage of FIGS. 3 to 10 are schematically illustrated. In addition, the pressure-increasing devices 10 and 10A are so-called single-acting type pressure-increasing devices.

First, a state before the pressure increase by the pressure-increasing devices 10 and 10A is started will be described. As illustrated in FIG. 1, the switch 15 is in an OFF state, and the electromagnetic switching valve 7 disconnects the oil passages 61 and 70.

In the pressure-increasing device 10 before the pressure increase is started, the piston 120 is disposed at the start position inside the casing 110.

In the pressure-increasing device 10, the oil is stored in the back pressure chamber 10-1, the pressure-increasing chamber 10-2, and the drain chamber 10-3, and the pressure of the oil is substantially the same as that of the oil stored in the tank T that is open to the outside.

As illustrated in FIG. 2, in a state where the piston 120 has reached the start position, the control valve 130 is at a maximum opening degree on the drain oil passages 131 and 134 sides, and is at a zero opening degree on the pilot oil passages 133 and 136 sides, namely, is fully closed.

Accordingly, the control valve 130 connects the oil passages 131 and 132. Substantially the same pressure as that of the oil in the tank T acts on the port 8-1 of the first switching valve 8. The first switching valve 8 connects the oil passages 70 and 80. This pressure is an initial value (refer to FIG. 11) in the present embodiment, and is smaller than a predetermined value at which the position of the switching valve 8 is switched.

Similarly, the control valve 130 connects the oil passages 134 and 135. Substantially the same pressure as that of the oil in the tank T acts on the port 8A-1 of the second switching valve 8A. The second switching valve 8A connects the oil passages 73 and 82.

Figure 3:
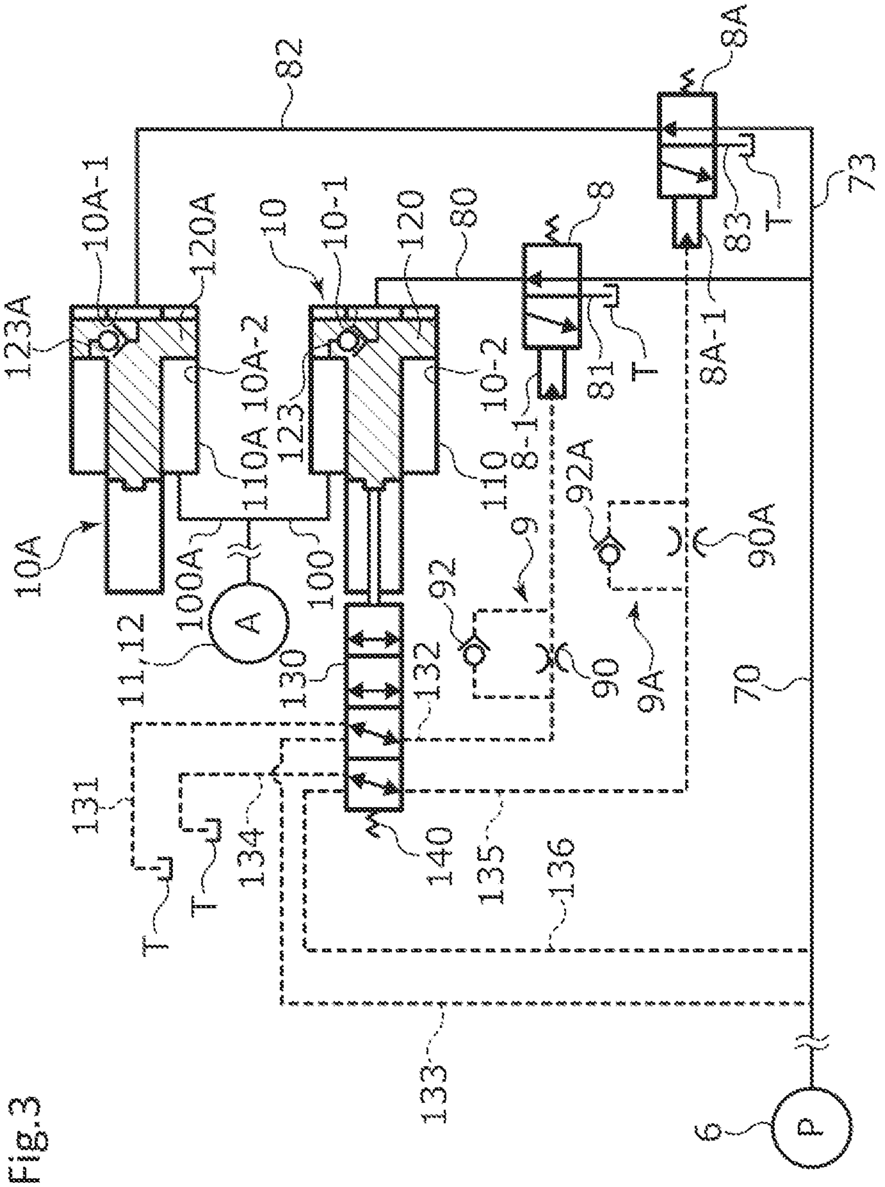
FIG. 3 is a schematic diagram for describing a pressure-increasing cycle of a working fluid performed by the pressure-increasing device in the first embodiment.

When the increase of the pressure by the pressure-increasing devices 10 and 10A is started, the switch 15 is set to an ON state. Accordingly, the electromagnetic switching valve 7 connects the oil passages 61 and 70, and as illustrated in FIG. 3, some of the hydraulic oil delivered from the pilot pump 6 passes through the oil passage 70, the first switching valve 8, and the oil passage 80, and is delivered to the back pressure chamber 10-1 of the first pressure-increasing device 10.

Here, the back pressure surface 121*a* of the piston 120 as an effective pressure-receiving area of the back pressure chamber 10-1 is wider in area than the pressure-increasing surface 121*b* of the piston 120 as an effective pressure-receiving area of the pressure-increasing chamber 10-2.

Accordingly, in the back pressure chamber 10-1, a pressing force obtained by multiplying the fluid pressure of the hydraulic oil delivered from the pilot pump 6 by the area of the back pressure surface 121*a* is generated to press the piston 120 to the end position side.

Accordingly, the hydraulic oil in the pressure-increasing chamber 10-2 is increased in pressure to a pressure calculated by dividing the pressing force by the area of the pressure-increasing surface 121*b*, and is sequentially delivered toward the oil passage 100 along with the movement of the piston 120.

Incidentally, in this description, since the pressure of the oil in the drain chamber 10-3 is substantially constant regardless of the movement of the piston 120, and the oil repeatedly flows in and out as the piston 120 moves, the description thereof will be omitted.

In addition, similarly to the first pressure-increasing device 10, the working fluid passes through the branch oil passage 73, the second switching valve 8A, and the oil passage 82, and is also delivered to the back pressure chamber 10A-1 of the second pressure-increasing device 10A. Accordingly, in the second pressure-increasing device 10A as well, the hydraulic oil in the pressure-increasing chamber 10A-2 is sequentially delivered toward the oil passage 100A along with the movement of the piston 120A.

Figure 11:
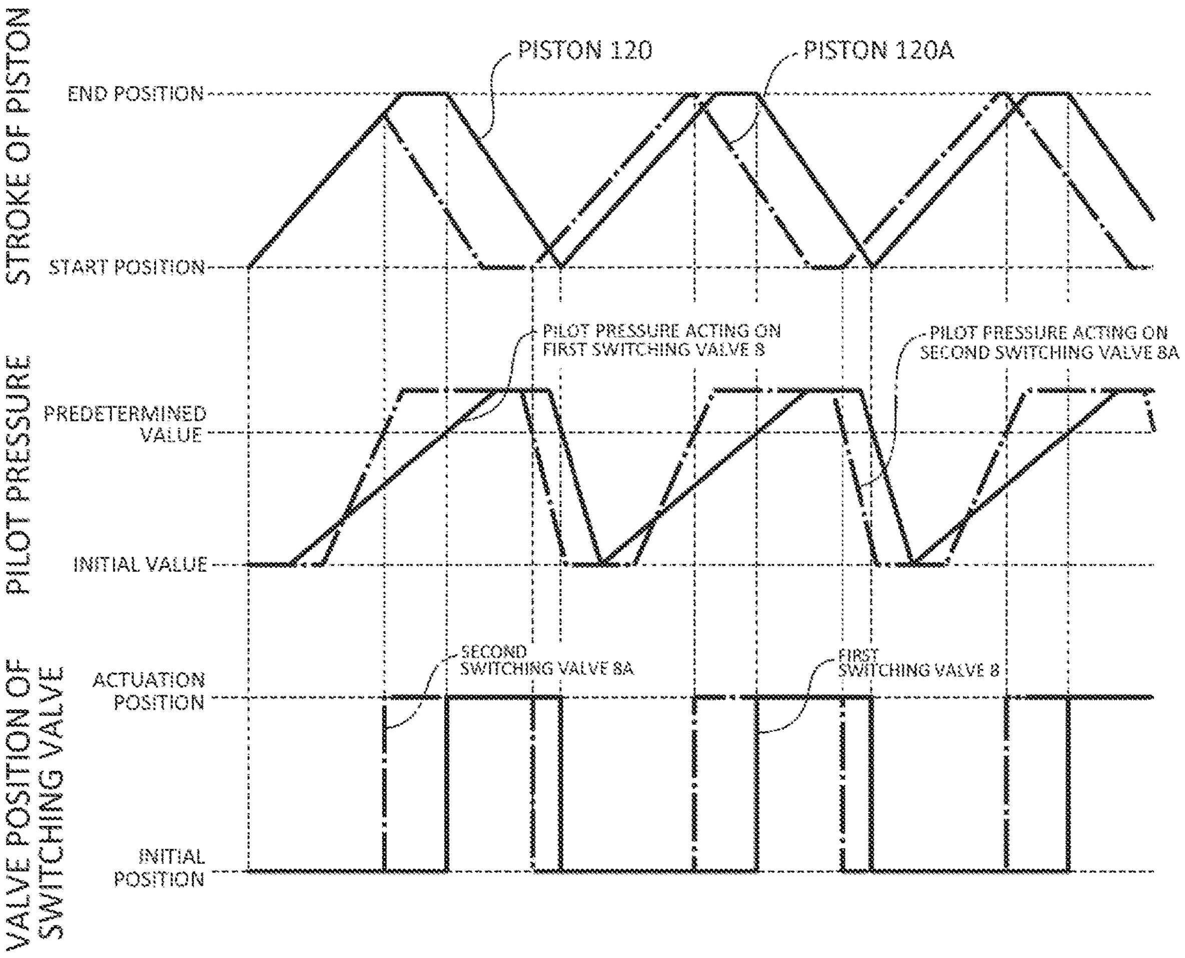
FIG. 11 is a graph for describing changes of main parts of the fluid circuit during the pressure-increasing cycle in the first embodiment.

Incidentally, as illustrated in FIG. 11, the pistons 120 and 120A of the pressure-increasing devices 10 and 10A move at substantially the same speed.

As illustrated in FIG. 2, when the piston 120 of the first pressure-increasing device 10 starts to move from the start position toward the end position, the control valve 130 starts to be displaced from a minimum stroke st0 toward a maximum stroke st5. After a stroke st1, the control valve 130 narrows the opening degree on the first drain oil passage 131 side, and widens the opening degree on the first pilot oil passage 133 side according to the stroke of the piston 120.

Then, after a stroke st2, the opening degree of the control valve 130 on the first pilot oil passage 133 side becomes wider than the opening degree on the first drain oil passage 131 side. For this reason, the pilot fluid is loaded on the port 8-1 of the first switching valve 8 through the first variable throttle 90 (refer to FIG. 11). In addition, after the stroke st2, the control valve 130 narrows the opening degree on the second drain oil passage 134 side, and widens the opening degree on the second pilot oil passage 136 side.

Further, the movement of the piston 120 progresses, and after a stroke st3, the control valve 130 sets the opening degree on the first drain oil passage 131 side to zero, namely, fully closed, and sets the opening degree on the first pilot oil passage 133 side to its maximum, namely, fully opened. In addition, after a stroke st4, the control valve 130 sets the opening degree on the second drain oil passage 134 side to fully closed, and sets the opening degree on the second pilot oil passage 136 side to fully opened.

By the way, the first variable throttle 90 is sufficiently narrower in opening degree than the second variable throttle 90A (refer to FIG. 3). Accordingly, the pilot fluid pressure acting on the port 8A-1 of the second switching valve 8A reaches the predetermined value or more at an earlier timing than the pilot fluid pressure acting on the port 8-1 of the first switching valve 8 (refer to FIG. 11).

Figure 4:
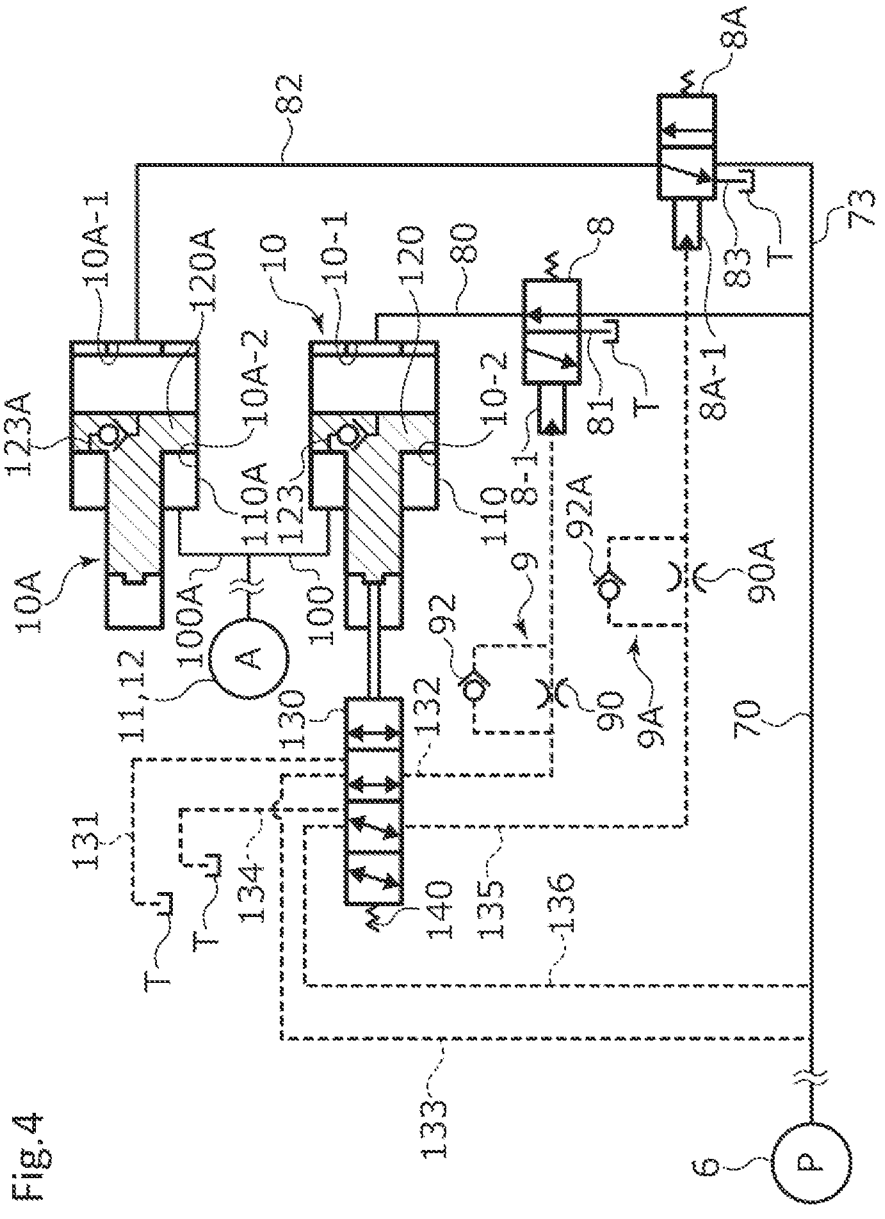
FIG. 4 is a schematic diagram for describing the pressure-increasing cycle of the working fluid performed by the pressure-increasing device in the first embodiment.

For this reason, before the piston 120 reaches the end position, the pilot fluid pressure acting on the port 8A-1 of the second switching valve 8A reaches the predetermined value or more (refer to FIG. 11). Accordingly, as illustrated in FIG. 4, the second switching valve 8A switches to an actuation position, and connects the oil passages 82 and 83.

Accordingly, the hydraulic oil in the back pressure chamber 10A-1 of the second pressure-increasing device 10A is discharged to the tank T through the oil passage 82, the second switching valve 8A, and the tank-side oil passage 83.

Thereafter, the pilot fluid pressure acting on the port 8A-1 becomes substantially the same pressure as that of the hydraulic oil delivered from the pilot pump 6 (refer to FIG. 11).

Then, when the pressure in the back pressure chamber 10A-1 decreases, the piston 120A starts to move toward a start position due to the biasing force of the spring 140A (refer to FIG. 1). As the piston 120A moves, some of the oil in the back pressure chamber 10A-1 flows into the pressure-increasing chamber 10A-2 through an oil passage 123A.

Figure 5:
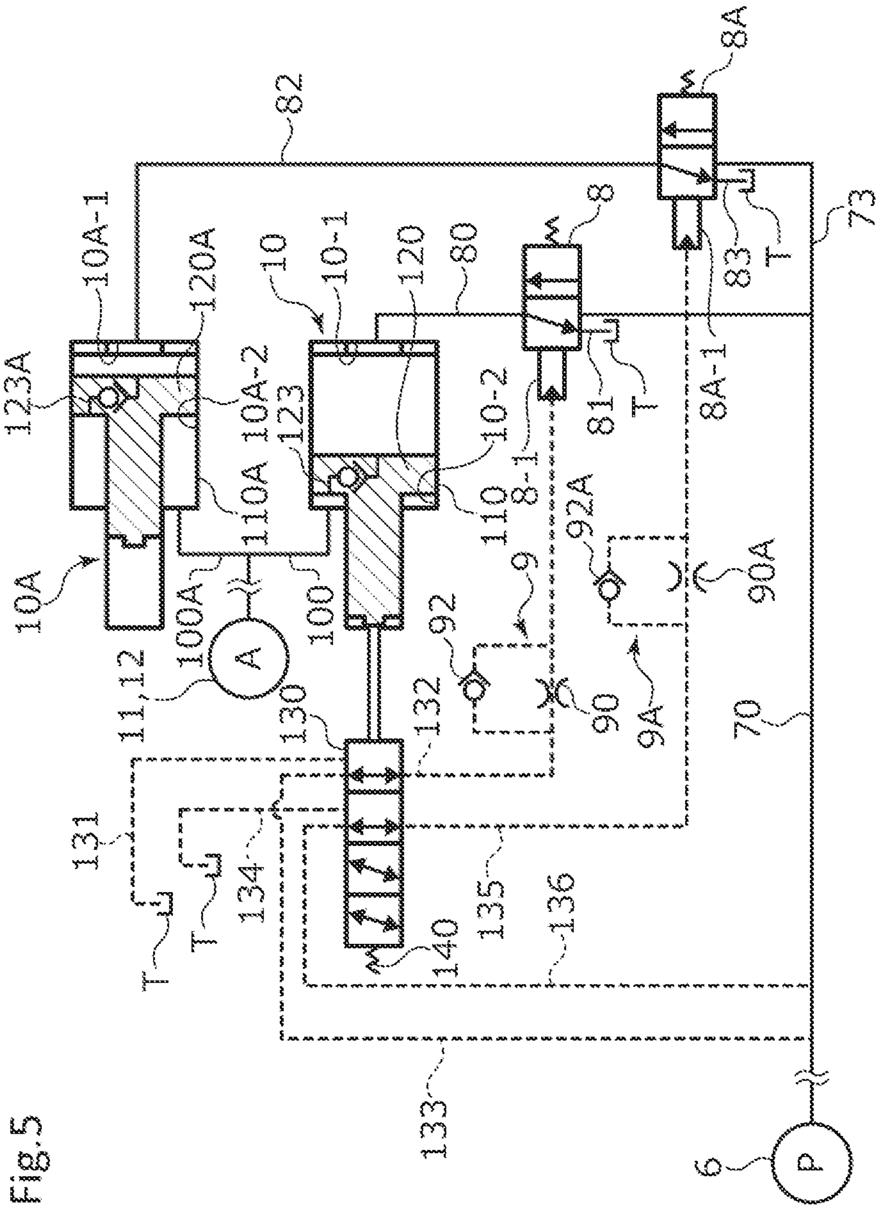
FIG. 5 is a schematic diagram for describing the pressure-increasing cycle of the working fluid performed by the pressure-increasing device in the first embodiment.

As illustrated in FIG. 5, in the middle of the advancement of the piston 120A of the second pressure-increasing device 10A toward the start position, in the first pressure-increasing device 10, the small-diameter portion 122 of the piston 120 comes into contact with the bottom of the small-diameter cylindrical portion 112 of the casing 110. Accordingly, the piston 120 reaches the end position, and the movement of the piston 120 is restricted. At this time, a slight volume is ensured in the pressure-increasing chamber 10-2. Namely, the small-diameter portion 122 of the piston 120 and the small-diameter cylindrical portion 112 of the casing 110 function as spacers.

As described above, the pressure-increasing devices 10 and 10A are connected in parallel with respect to the oil passage 70. Accordingly, for example, compared to a configuration in which the compression efficiency per unit time by cooperation between the pressure-increasing devices 10 and 10A is achieved by one pressure-increasing device, the hydraulic oil amount per unit time flowing into each of the pressure-increasing devices 10 and 10A is reduced. For this reason, the peak pressure generated when one of the pistons 120 and 120A of the pressure-increasing devices 10 and 10A reaches or stops at the end position is relatively reduced.

In addition, the pressure-increasing chamber 10-2 of the first pressure-increasing device 10 and the pressure-increasing chamber 10A-2 of the second pressure-increasing device 10A are connected in parallel so as to be able to communicate with each other through the oil passages 100 and 100A. Accordingly, when the piston 120 of the first pressure-increasing device 10 stops, the pressure-increasing chamber 10A-2 of the second pressure-increasing device 10A functions as a buffer. Similarly, when the piston 120A of the second pressure-increasing device 10A stops, the pressure-increasing chamber 10-2 of the first pressure-increasing device 10 functions as a buffer. In such a manner, the fluid circuit can reduce vibration or noise generated when the pressure of the hydraulic oil is increased.

Thereafter, when the pilot fluid pressure acting on the port 8-1 of the first switching valve 8 reaches the predetermined value or more, the first switching valve 8 switches to an actuation position, and connects the oil passages 80 and 81. Accordingly, the hydraulic oil in the back pressure chamber 10-1 of the first pressure-increasing device 10 is discharged to the tank T through the oil passage 80, the first switching valve 8, and the tank-side oil passage 81.

Then, when the pressure in the back pressure chamber 10-1 decreases, the piston 120 starts to move toward the start position due to the biasing force of the spring 140. Accordingly, the control valve 130 starts to be displaced from the maximum stroke st5 toward the minimum stroke st0.

As the piston 120 moves toward the start position, some of the oil in the back pressure chamber 10-1 flows into the pressure-increasing chamber 10-2 through the oil passage 123.

Figure 6:
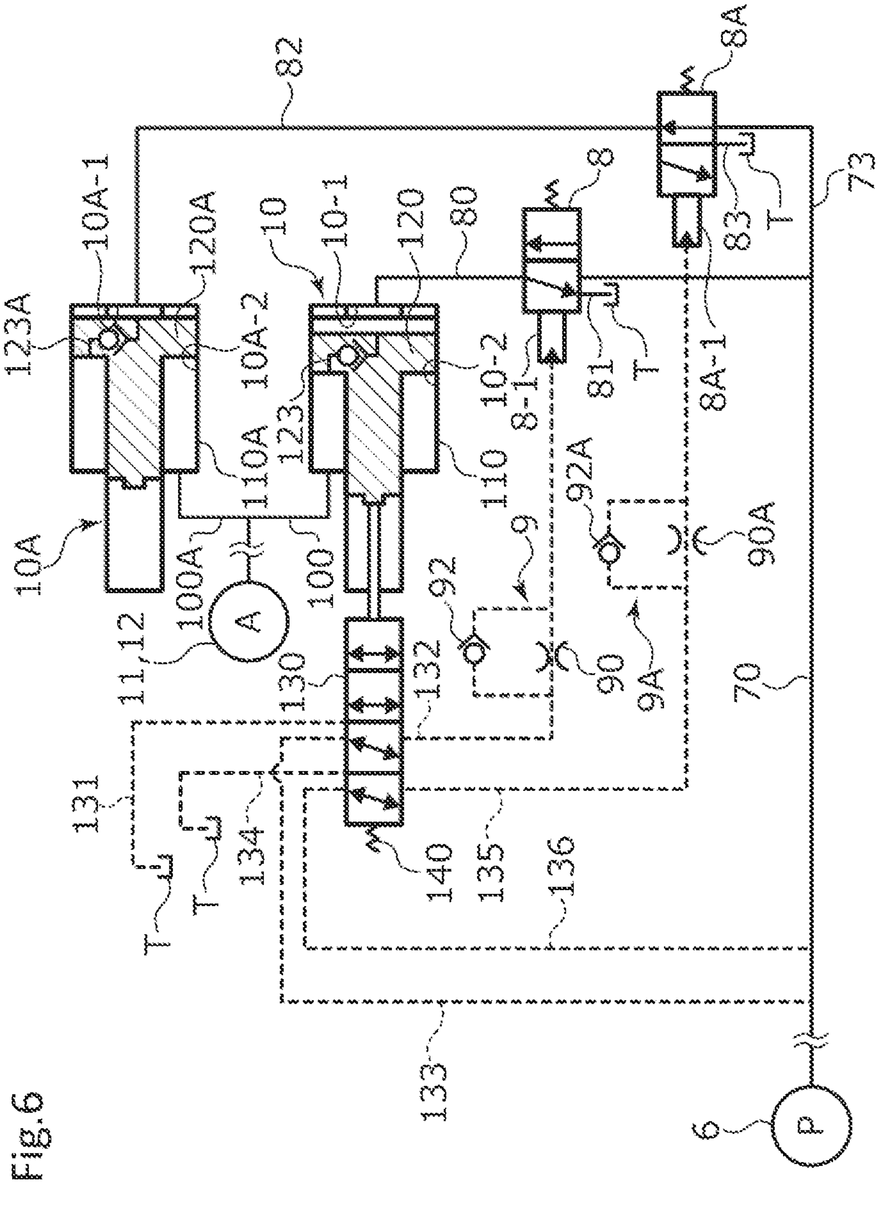
FIG. 6 is a schematic diagram for describing the pressure-increasing cycle of the working fluid performed by the pressure-increasing device in the first embodiment.

Referring to FIG. 6, the piston 120A of the second pressure-increasing device 10A reaches the start position before the piston 120 of the first pressure-increasing device 10 reaches the start position. On the other hand, the piston 120 of the first pressure-increasing device 10 is in the middle of movement toward the start position.

By the way, after the stroke st4, the control valve 130 widens the opening degree on the second drain oil passage 134 side, and narrows the opening degree on the second pilot oil passage 136 side according to the stroke of the piston 120.

Then, after the stroke st3, the opening degree of the control valve 130 on the second pilot oil passage 136 side becomes wider than the opening degree on the second drain oil passage 134 side. For this reason, the pilot fluid is discharged to the tank T through the second variable throttle 90A and the second check valve 92A. In addition, after the stroke st3, the control valve 130 widens the opening degree on the first drain oil passage 131 side, and narrows the opening degree on the first pilot oil passage 133 side.

Further, the movement of the piston 120 progresses, and after the stroke st2, the control valve 130 sets the opening degree on the second drain oil passage 134 side to fully opened, and sets the opening degree on the first pilot oil passage 133 side to fully closed. In addition, after the stroke st1, the control valve 130 sets the opening degree on the first drain oil passage 131 side to fully opened, and sets the opening degree on the first pilot oil passage 133 side to fully closed.

For this reason, as illustrated in FIG. 6, after the piston 120A of the second pressure-increasing device 10A has reached the start position, the pilot fluid pressure acting on the port 8A-1 of the second switching valve 8A becomes less than the predetermined value (refer to FIG. 11). Accordingly, the second switching valve 8A switches to an initial position, and connects the oil passages 73 and 82 (refer to FIG. 11). Namely, the piston 120A of the second pressure-increasing device 10A starts to move toward the end position earlier than when the piston 120 of the first pressure-increasing device 10 reaches the start position.

In such a manner, after the piston 120A of the second pressure-increasing device 10A has reached the start position, the timing that the valve position of the control valve 130 is switched, the flow passage cross-sectional areas of the oil passages 134 and 135, and the opening degree of the second check valve 92A are adjusted such that the pilot fluid pressure acting on the port 8A-1 of the second switching valve 8A becomes less than the predetermined value.

In addition, in a state where the second drain oil passage 134 and the pilot oil passage 135 are connected to each other, the second check valve 92A that is wider in opening degree than the second variable throttle 90A is opened. For this reason, the second switching valve 8A switches from the actuation position to the initial position in a shorter time than the time it takes for the second switching valve 8A to switch from the initial position to the actuation position. In other words, compared to a configuration in which the opening degrees of the throttles or the flow passage cross-sectional areas of the flow passages are simply different between the pilot flow passages on a first switching valve 8 side and a second switching valve 8A side, the adjustable flow return valves 9 and 9A can increase the number of strokes per unit time.

Incidentally, in the present embodiment, as illustrated in FIG. 11, the speed at which the pistons 120 and 120A move from the end positions toward the start positions is described as being higher than the speed at which the pistons 120 and 120A move from the start positions toward the end positions; however, the movement speeds of the pistons 120 and 120A may be the same.

Figure 7:
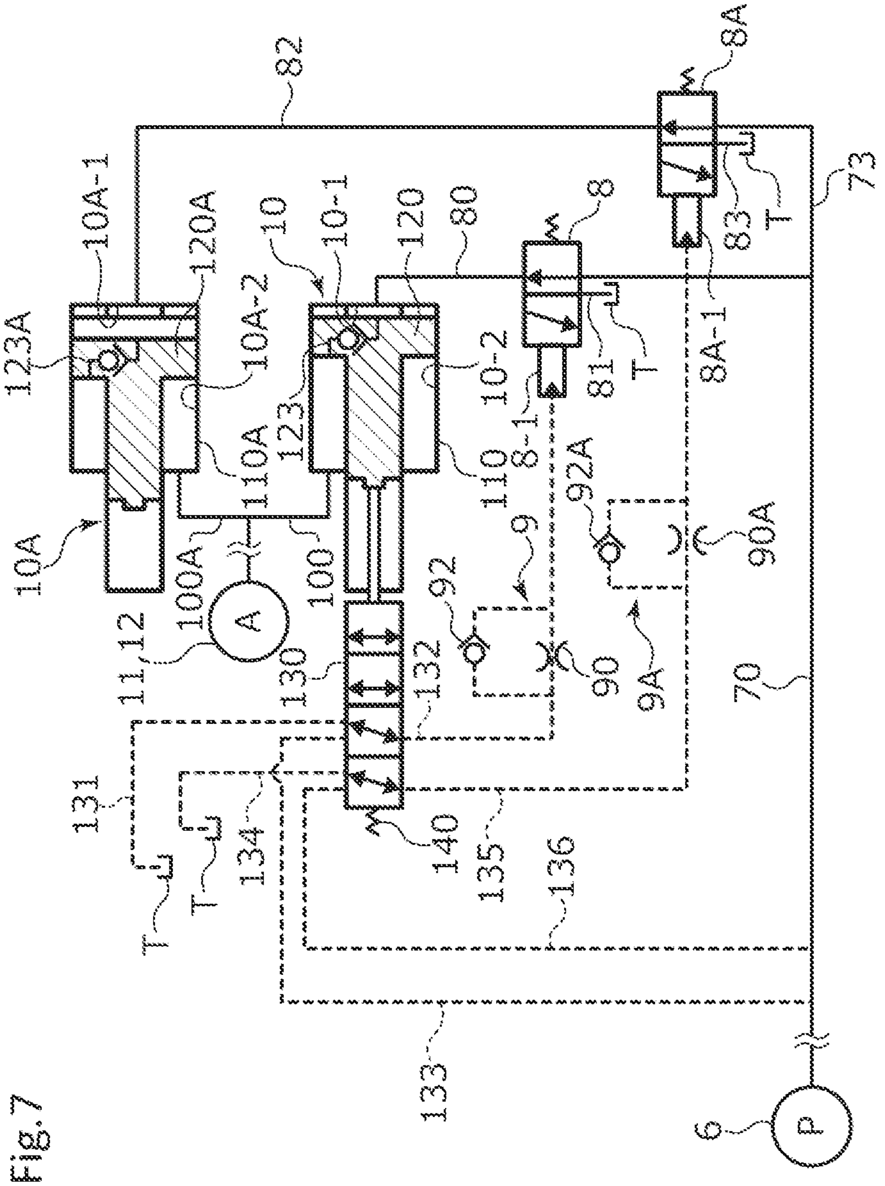
FIG. 7 is a schematic diagram for describing the pressure-increasing cycle of the working fluid performed by the pressure-increasing device in the first embodiment.

Thereafter, as illustrated in FIG. 7, the piston 120 of the first pressure-increasing device 10 reaches the start position. In addition, the pilot fluid pressure acting on the port 8-1 of the first switching valve 8 becomes less than the predetermined value (refer to FIG. 11). Accordingly, the first switching valve 8 switches to an initial position, and connects the oil passages 70 and 80.

Figure 8:
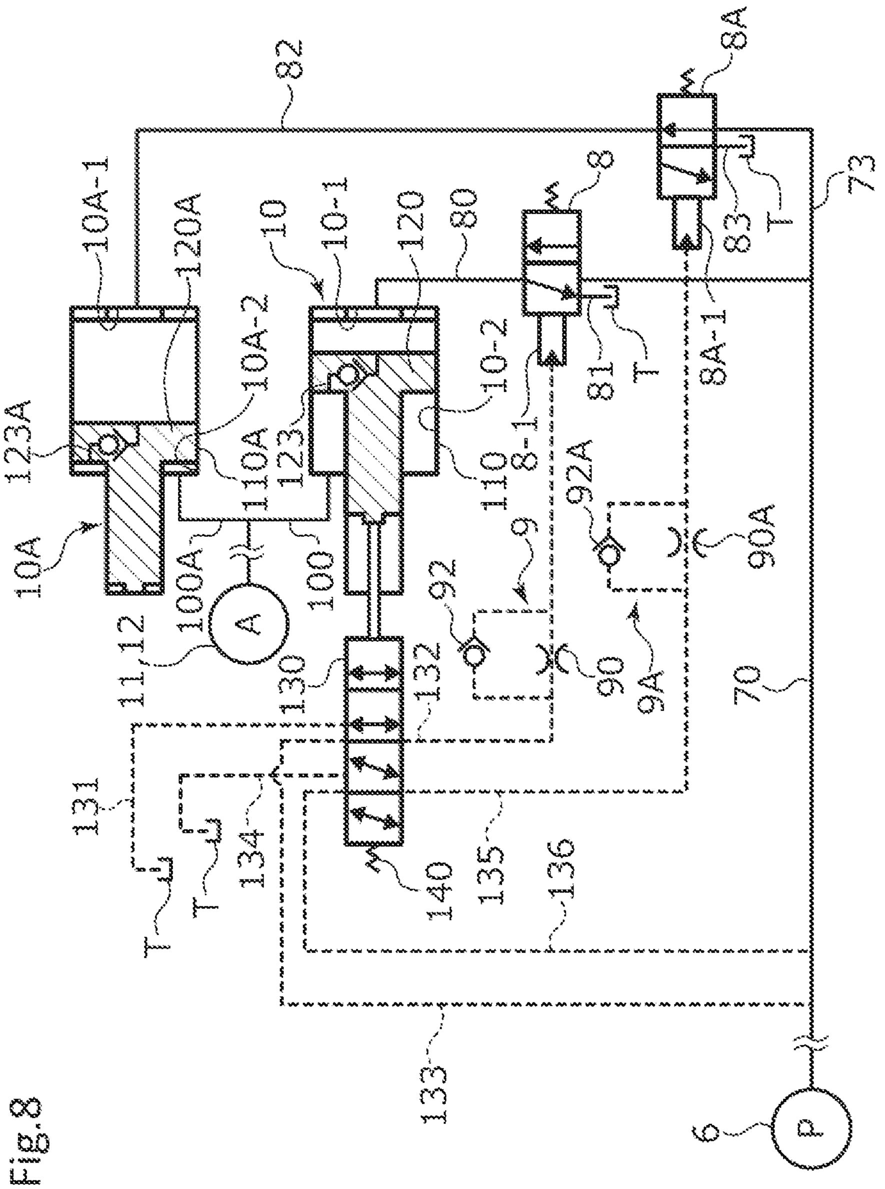
FIG. 8 is a schematic diagram for describing the pressure-increasing cycle of the working fluid performed by the pressure-increasing device in the first embodiment.

As illustrated in FIG. 8, the piston 120A of the second pressure-increasing device 10A reaches the end position before the piston 120 of the first pressure-increasing device 10 reaches the end position. The piston 120A of the second pressure-increasing device 10A stands by at the start position until the valve position of the control valve 130 is switched and the valve position of the second switching valve 8A is switched from the initial position to the actuation position (refer to FIG. 11).

Figure 9:
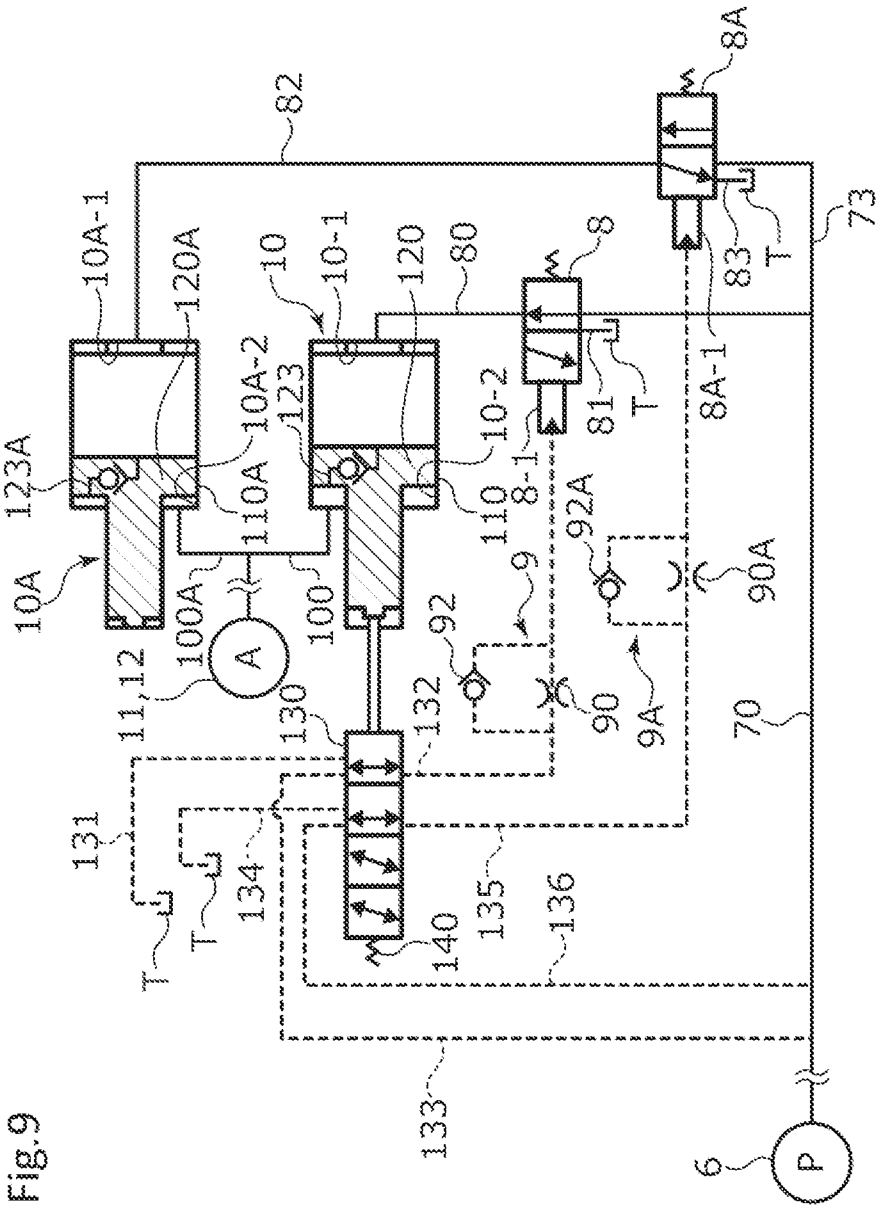
FIG. 9 is a schematic diagram for describing the pressure-increasing cycle of the working fluid performed by the pressure-increasing device in the first embodiment.

As illustrated in FIG. 9, the piston 120A of the second pressure-increasing device 10A starts to move toward the start position when the valve position of the control valve 130 is switched and the valve position of the second switching valve 8A is switched to the actuation position (refer to FIG. 11).

Figure 10:
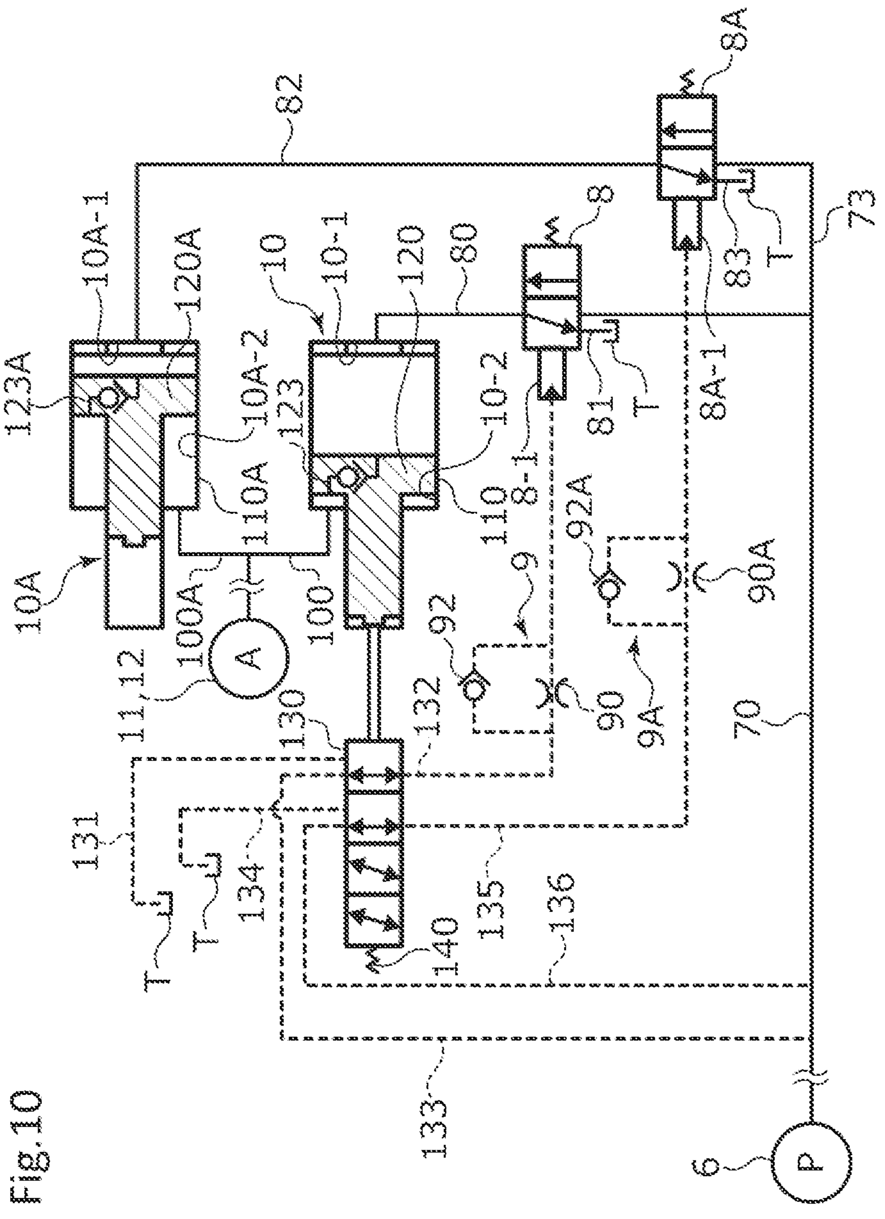
FIG. 10 is a schematic diagram for describing the pressure-increasing cycle of the working fluid performed by the pressure-increasing device in the first embodiment.

As illustrated in FIG. 10, the piston 120 of the first pressure-increasing device 10 starts to move toward the start position when the control valve 130 is switched and the valve position of the first switching valve 8 is switched to the actuation position (refer to FIG. 11).

Thereafter, when the switch 15 is in an ON state, the cycles illustrated in FIGS. 6 to 10 can be repeatedly performed. Namely, the first pressure-increasing device 10 and the second pressure-increasing device 10A can be continuously driven using the fluid pressure.

In addition, when the switch 15 is set to an OFF state, as illustrated in FIG. 1, the electromagnetic switching valve 7 connects the oil passages 61 and 70. Accordingly, the back pressure chambers 10-1 and 10A-1 are connected to the tank T. For this reason, both the pistons 120 and 120A move toward the start positions, and stop at the start positions.

As described above, the fluid circuit of the present embodiment can repeatedly reciprocate two pistons 120 and 120A through cooperation between the switching valves 8 and 8A and the control valve 130 that are operated by the fluid pressure using the working fluid. Namely, a high fluid pressure can be continuously generated without performing electric control. Accordingly, electric control as in the related art is not required, so that the configuration of the fluid circuit can be simplified.

In addition, two pressure-increasing devices 10 and 10A are such that the stroke timings of the pistons 120 and 120A are offset from each other. In other words, the pistons 120 and 120A are prevented from reaching the end positions at the same timing. Accordingly, the peak pressure of the hydraulic oil delivered from the two pressure-increasing devices 10 and 10A is decreased. For this reason, the fluid circuit can reduce vibration or noise generated when the pressure of the oil is increased.

In addition, with a simple configuration in which the stroke directions of the corresponding pistons 120 and 120A are switched using the switching valves 8 and 8A of which the valve positions are switched using the oil as the pilot fluid, the fluid circuit can differentiate the phases of the two pistons 120 and 120A.

In addition, with a simple configuration in which the opening degrees of the variable throttles 90 and 90A are different from each other, the fluid circuit can offset the phases of the pistons 120 and 120A from each other.

In addition, in differentiating the phases of the strokes of the two pistons 120 and 120A, for example, adjustments performed according to errors of each member when the fluid circuit is used for the first time, and even thereafter, adjustments performed according to temperature, air pressure, aging, and the like can be achieved by adjusting the opening degrees of the variable throttles 90 and 90A in the fluid circuit. For this reason, in the fluid circuit, the timings of switching the valve positions of the switching valves 8 and 8A are easily adjusted.

In addition, for example, when the pressure-increasing devices include the respective control valves of which the valve positions are switched according to the strokes of the individual pistons, it is considered that the timing that one control valve switches with respect to the other control valve changes relative thereto due to aging, external force, or the like. In contrast, in the fluid circuit of this specification, the control valve 130 is switched by the stroke of the piston 120 of the first pressure-increasing device 10. For this reason, even when a change occurs in the timing that the valve position of the control valve 130 is switched, the influence of the change equally affects each of the pressure-increasing devices 10 and 10A. Accordingly, the phase of the piston 120A of the second pressure-increasing device 10A is accurately offset from that of the piston 120 of the first pressure-increasing device 10.

Second Embodiment

Next, a fluid circuit according to a second embodiment of the present invention will be described with reference to FIG. 12. Incidentally, the same reference signs are assigned to the same components as the components illustrated in the first embodiment, and the duplicate descriptions will be omitted.

Figure 12:
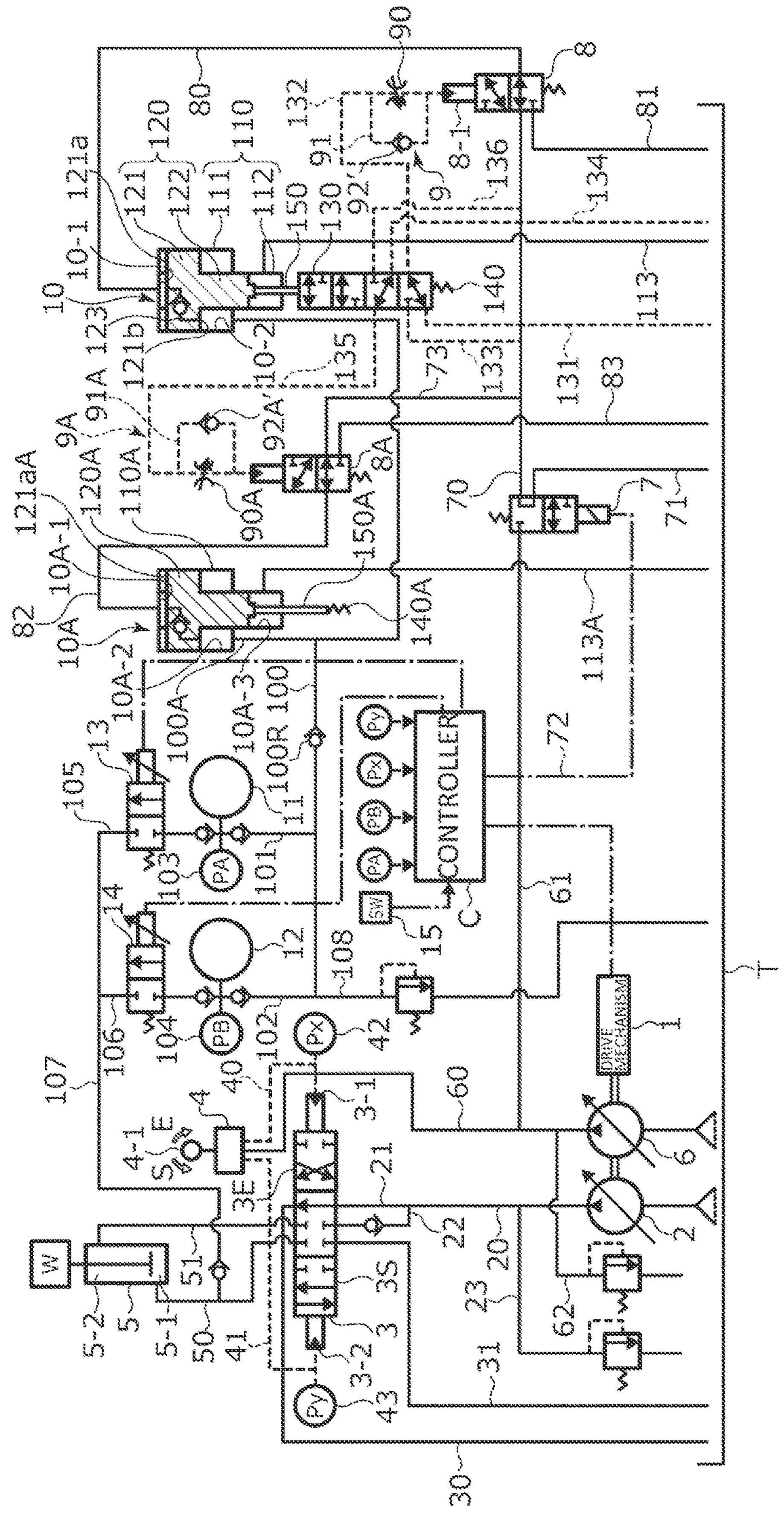
FIG. 12 is a schematic diagram illustrating a fluid circuit including pressure-increasing devices, according to a second embodiment of the present invention.

As illustrated in FIG. 12, the first adjustable flow return valve 9 includes a first check valve 92' that is opened in a state where the first pilot oil passages 132 and 133 are connected to each other. Similarly, the second adjustable flow return valve 9A also includes a second check valve 92A' that is opened in a state where the second pilot oil passages 135 and 136 are connected to each other.

In addition, when the piston 120 moves from the start position toward the end position, the control valve 130 first connects the second pilot oil passages 135 and 136, and then, connects the first pilot oil passages 132 and 133.

Accordingly, the hydraulic oil delivered from the pilot pump 6 flows into the second pilot oil passage 135 before flowing into the first pilot oil passage 132. For this reason, the second switching valve 8A switches to the actuation position earlier than the first switching valve 8.

In addition, when the piston 120 moves from the end position toward the start position, the control valve 130 first connects the first drain oil passage 131 and the first pilot oil passage 132, and then, connects the second drain oil passage 134 and the second pilot oil passage 135.

Accordingly, it takes longer time for the pilot fluid pressure to become less than the predetermined value in the first pilot oil passage 132 in which the first variable throttle 90 having a sufficiently narrower opening degree than the second variable throttle 90A is disposed than in the second pilot oil passage 135 in which the second variable throttle 90A is disposed. For this reason, the second switching valve 8A switches to the initial position earlier than the first switching valve 8.

In such a manner, the configurations of the adjustable flow return valves 9 and 9A and the control valve 130 may be changed as appropriate.

The embodiments of the present invention have been described above with reference to the drawings; however, the specific configurations are not limited to the embodiments, and modifications or additions that are made without departing from the scope of the present invention are included in the present invention.

For example, in the embodiments, a configuration in which the working fluid is oil has been described; however, the present invention is not limited thereto, and the working fluid may be changed as appropriate as long as it is a fluid.

In addition, in the embodiments, a configuration in which two pressure-increasing devices are provided has been described; however, the present invention is not limited thereto, and three or more pressure-increasing devices may be provided. With such a configuration, since the piston of at least one of a plurality of the pressure-increasing devices can be moved from the start position to the end position, the generation of a peak pressure can be prevented.

In the embodiments, each pressure-increasing device has been described as being of a single-acting type, but is not limited thereto, and may be of a double-acting type. With such a configuration, in a state where the piston is in stroke, since the working fluid delivered from the fluid supply device inevitably flows into one of the pressure-increasing devices, the generation of a peak pressure can be prevented. In addition, since only two pressure-increasing devices may be provided, the fluid circuit can be compactly configured.

In addition, a configuration in which two pressure-increasing devices are connected to the corresponding switching valves has been described; however, the present invention is not limited thereto, and for example, in a configuration in which three or more pressure-increasing devices are provided, two pressure-increasing devices may be such that the stroke directions of the respective pistons are switched by a common switching valve.

In addition, in the embodiments, a configuration in which two accumulators are disposed on a downstream side of the pressure-increasing devices has been described; however, the present invention is not limited thereto, and the number of the accumulators may be one or may be three or more.

In addition, in the embodiments, a configuration in which the control valve connects a pump-side flow passage and a drain-side flow passage to a switching valve-side flow passage at the same timing has been described; however, the present invention is not limited thereto, and a configuration in which only one of the pump-side flow passage and the drain-side flow passage is connected to the switching valve-side flow passage may be employed.

In addition, in the embodiments, a configuration in which the timing that the opening degree on the first pressure-increasing device side becomes its maximum or zero and the timing that the opening degree on a second pressure-increasing device side becomes its maximum or zero are different from each other has been described; however, the present invention is not limited thereto, and the timings may be the same.

In addition, in the embodiments, a configuration in which the phases of the strokes of two pistons are differentiated according to the opening degrees of the throttles has been described; however, the present invention is not limited thereto, and the method for differentiating the phases of the strokes of the two pistons may be changed as appropriate, for example, by differentiating one of the opening degrees of the control valve, the maximum strokes of the switching valves, the volumes of the oil passages connected to each port of the switching valve, the volumes of the cylinders of the pressure-increasing devices, the maximum strokes of the pistons of the pressure-increasing devices, and the biasing forces of the biasing means that return the switching valves to the initial positions.

In addition, in the embodiments, a configuration in which the adjustable flow return valves include the throttles has been described; however, the present invention is not limited thereto, and the throttles may be non-variable throttles, may be various valves that are adjustable in flow passage cross-sectional area, may be configured such that the flow passage cross-sectional areas of the flow passages are different from each other, or may be changed as appropriate.

In addition, in the embodiments, the fluid supply device has been described as being the pilot circuit hydraulic pump, but is not limited thereto, may be the main circuit hydraulic pump, the actuator, the accumulator, or the like, or may be changed as appropriate.

In addition, in the embodiments, a configuration in which the hydraulic oil delivered from the pressure-increasing device is delivered to the accumulator has been described; however, the present invention is not limited thereto, and the hydraulic oil may be delivered to the actuator.

In addition, the shapes of the casing and the piston are not limited to those described in the embodiments, and the shapes of the casing and the piston may be changed as appropriate as long as the configuration is such that a difference between the effective pressure-receiving areas is provided.

In addition, in the first and second embodiments, a configuration in which the biasing means is a spring has been described; however, the present invention is not limited thereto, and the biasing means may be a magnet or the like or may be changed as appropriate.

REFERENCE SIGNS LIST

1 Drive mechanism
6 Pilot circuit hydraulic pump (fluid supply device)
8 First switching valve (pilot switching valve)
8A Second switching valve (pilot switching valve)
9 First adjustable flow return valve
9A Second adjustable flow return valve
10 First pressure-increasing device (one of pressure-increasing devices)
10-1 Back pressure chamber
10-2 Pressure-increasing chamber

10A Second pressure-increasing device (remaining one of pressure-increasing devices)

10A-1 Back pressure chamber

10A-2 Pressure-increasing chamber

11, 12 Accumulator

90, 90A Variable throttle

110, 110A Casing (cylinder)

120, 120A Piston

T Tank

W Workpiece

The invention claimed is:

1. A fluid circuit, comprising:

a fluid supply device configured to deliver a working fluid; and pressure-increasing devices configured to increase a pressure of the working fluid, wherein each of the pressure-increasing devices includes a cylinder connected to the fluid supply device, and a piston provided inside the cylinder and configured to be reciprocatable in an axial direction, and delivers, from the cylinder, the working fluid having the pressure which is increased due to a movement of the piston toward a pressure-increasing chamber inside the cylinder by the working fluid delivered from the fluid supply device, the pressure-increasing devices are connected in parallel to the fluid supply device, wherein the fluid circuit further comprises a pilot switching valve provided for each of the pressure-increasing devices, each of which uses the working fluid delivered from the fluid supply device, as a pilot fluid, wherein each of the pilot switching valves has a port and valve positions and is configured to switch between the valve positions according to pressure acting on the port, wherein each of the pressure-increasing devices is configured to switch stroke directions of the piston according to the valve position of each of the pilot switching valves, and wherein the fluid circuit further comprises a adjustable flow return valve which is configured to supply each of pressures having different pressure waves to each of the ports of the pilot switching valves such that a phase of the piston of at least one of the pressure-increasing devices is different from a phase of the piston of remaining at least one of the pressure-increasing devices.

2. The fluid circuit according to claim 1, wherein a throttle of the adjustable flow return valve is disposed between the fluid supply device and the respective pilot switching valves, and opening degrees of at least one of the throttles and remaining at least one of the throttles are different from each other.

3. The fluid circuit according to claim 2, wherein the throttles are variable throttles.

4. The fluid circuit according to claim 1, wherein a pilot control valve is configured to switch a flow of the pilot fluid of the pilot switching valves is provided, and the pilot control valve is configured to switch by a movement of the piston of the one of the pressure-increasing devices.

5. The fluid circuit according to claim 1, wherein the pressure-increasing chambers of the pressure-increasing devices are connected in parallel.

6. The fluid circuit according to claim 2, wherein a pilot control valve is configured to switch a flow of the pilot fluid of the pilot switching valves is provided, and the pilot control valve is configured to switch by a movement of the piston of the one of the pressure-increasing devices.

7. The fluid circuit according to claim 3, wherein a pilot control valve is configured to switch a flow of the pilot fluid of the pilot switching valves is provided, and the pilot control valve is configured to switch by a movement of the piston of the one of the pressure-increasing devices.

* * * * *